United States Patent
Jehan et al.

(10) Patent No.: US 10,055,413 B2
(45) Date of Patent: Aug. 21, 2018

(54) IDENTIFYING MEDIA CONTENT

(71) Applicant: Spotify AB, Stockholm (SE)

(72) Inventors: Tristan Jehan, Brooklyn, NY (US); Dariusz Dziuk, Stockholm (SE); Gustav Söderström, Ekerö (SE); Mateo Rando, Stockholm (SE); Nicola Montecchio, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 14/945,008

(22) Filed: Nov. 18, 2015

(65) Prior Publication Data
US 2016/0342598 A1 Nov. 24, 2016

Related U.S. Application Data

(60) Provisional application No. 62/163,921, filed on May 19, 2015.

(51) Int. Cl.
*G06F 17/30* (2006.01)
*G11B 27/031* (2006.01)
(Continued)

(52) U.S. Cl.
CPC .... *G06F 17/30053* (2013.01); *G06F 17/3053* (2013.01); *G06F 17/30743* (2013.01);
(Continued)

(58) Field of Classification Search
CPC ......... G06F 17/30864; G06F 17/30876; G06F 17/30846; G06F 17/30053; G06F 17/3053; G06F 17/30743
See application file for complete search history.

(56) References Cited

U.S. PATENT DOCUMENTS 8,101,843 B2   1/2012  Turner
8,254,829 B1   8/2012  Kindred et al.
(Continued)

FOREIGN PATENT DOCUMENTS

EP   1 705 588 A1   9/2006
EP   1821309 A1    8/2007
(Continued)

OTHER PUBLICATIONS

Extended European Search Report for European Patent Application No. 16169963.2, dated Oct. 21, 2016, 9 pages.
(Continued)

*Primary Examiner* — Loc Tran
(74) *Attorney, Agent, or Firm* — Merchant & Gould P.C.

(57) ABSTRACT

Systems, devices, apparatuses, components, methods, and techniques for identifying media content for playback during a repetitive motion activity are provided. An example media-playback device includes a media-output device that plays media content items and a repetitive-motion activity content identification engine. The repetitive-motion activity content identification engine is configured to: review media content items to identify the media content items that are conducive to performing repetitive-motion activities; and select certain media content items from the media content items, the certain media content items being conducive to performing the repetitive-motion activities.

20 Claims, 10 Drawing Sheets

(51) Int. Cl.
*G11B 27/28* (2006.01)
*G11B 27/32* (2006.01)

(52) U.S. Cl.
CPC .. *G06F 17/30764* (2013.01); *G06F 17/30772* (2013.01); *G11B 27/031* (2013.01); *G11B 27/28* (2013.01); *G11B 27/329* (2013.01)

(56) References Cited

U.S. PATENT DOCUMENTS

| | | | |
|---|---|---|---|
| 8,626,607 | B1 | 1/2014 | Wood et al. |
| 9,503,500 | B2 | 11/2016 | Bernhardsson et al. |
| 2003/0205124 | A1 | 11/2003 | Foote et al. |
| 2005/0211072 | A1 | 9/2005 | Lu et al. |
| 2005/0223879 | A1 | 10/2005 | Huffman |
| 2006/0107822 | A1 | 5/2006 | Bowen |
| 2006/0230065 | A1* | 10/2006 | Plastina ............ G06F 17/30053 |
| 2006/0243120 | A1 | 11/2006 | Takai et al. |
| 2006/0276919 | A1* | 12/2006 | Shirai ................ A63B 71/0686 700/94 |
| 2007/0044641 | A1 | 3/2007 | McKinney et al. |
| 2007/0074617 | A1 | 4/2007 | Vergo |
| 2007/0074618 | A1 | 4/2007 | Vergo |
| 2007/0074619 | A1 | 4/2007 | Vergo |
| 2007/0118043 | A1 | 5/2007 | Oliver et al. |
| 2007/0203421 | A1 | 8/2007 | Cho et al. |
| 2007/0204744 | A1 | 9/2007 | Sako et al. |
| 2007/0261538 | A1 | 11/2007 | Takai et al. |
| 2008/0072741 | A1 | 3/2008 | Ellis |
| 2008/0096726 | A1 | 4/2008 | Riley et al. |
| 2008/0147711 | A1* | 6/2008 | Spiegelman ........ G06F 17/3002 |
| 2008/0153671 | A1 | 6/2008 | Ogg et al. |
| 2009/0025539 | A1 | 1/2009 | Sagoo et al. |
| 2010/0168879 | A1 | 7/2010 | Takatsuka et al. |
| 2011/0093100 | A1 | 4/2011 | Ramsay |
| 2012/0254907 | A1 | 10/2012 | Serdiuk |
| 2013/0099116 | A1 | 4/2013 | Bertin-Mahieux et al. |
| 2014/0270375 | A1* | 9/2014 | Canavan ............ A63B 24/0062 382/103 |
| 2014/0277648 | A1 | 9/2014 | Chong et al. |
| 2015/0081066 | A1 | 3/2015 | Yeh et al. |
| 2015/0142147 | A1 | 5/2015 | Stanghed et al. |

FOREIGN PATENT DOCUMENTS

| | | |
|---|---|---|
| WO | 2006/072961 A2 | 7/2006 |
| WO | 2014/096832 A1 | 6/2014 |

OTHER PUBLICATIONS

The Echonest, "Analyzer Documentation", Version 3.2, Jan. 7, 2014, 7 pages.
U.S. Appl. No. 14/883,252, filed Oct. 14, 2015 for "Repetitive Motion Activity Enhancement Based Upon Media Content Selection".
U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media Content Selection".
U.S. Appl. No. 14/883,298, filed Oct. 14, 2015 for "Cadence-Based Playlists Management System".
U.S. Appl. No. 14/883,273, filed Oct. 14, 2015 for "Multi-Track Playback of Media Content During Repetitive Motion Activities".
U.S. Appl. No. 14/883,295, filed Oct. 14, 2015 for "Search Media Content Based Upon Tempo".
U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/883,323, filed Oct. 14, 2015 for "Accessibility Management System for Media Content Items".
U.S. Appl. No. 14/883,336, filed Oct. 14, 2015 for "Selection and Playback of Song Versions Using Cadence".
U.S. Appl. No. 14/883,340, filed Oct. 14, 2015 for "Cadence-Based Selection, Playback, and Transition Between Song Versions".
International Search Report and Written Opinion from International Patent Application No. PCT/US2017/036575, dated Jul. 17, 2017.
Geoffray Bonnin et al: "Automated Generation of Music Playlists: Survey and Experiments", ACM Computing Surveys., vol. 47, No. 2, Nov. 12, 2014 (Nov. 12, 2014), pp. 1-35.
Summons to Attend Oral Proceedings from the European Patent Office for European Application No. 16169963.2, dated Oct. 31, 2017, 10 pages.
International Search Report and Written Opinion from International Patent Application No. PCT/US2017/036571, dated Aug. 4, 2017.

\* cited by examiner

IDENTIFYING MEDIA CONTENT

CROSS-REFERENCE TO RELATED APPLICATION

This application claims priority to U.S. Ser. No. 62/163,921, filed on May 19, 2015, and entitled IDENTIFYING MEDIA CONTENT, the disclosure of which is hereby incorporated by reference in its entirety.

BACKGROUND

Running, as well as many other recreation or fitness activities, include repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive-motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to identifying media content that is suitable for playback during repetitive-motion activities. In one possible configuration and by non-limiting example, a media-delivery system analyzes media content items to generate a score that is indicative of the suitability of the media content item for playback during a repetitive-motion activity. Various aspects are described in this disclosure, which include, but are not limited to, the following aspects.

In one aspect, a media-playback device comprising: a media-output device that plays media content items; and a repetitive-motion activity content identification engine configured to: review media content items to identify the media content items that are conducive to performing repetitive-motion activities; and select certain media content items from the media content items, the certain media content items being conducive to performing the repetitive-motion activities.

In another aspect, a method for selecting media content that is suitable for running, the method comprising: reviewing a list of media content items; comparing each of the media content items to a model, the model being indicative of a suitability of a media content item to running; identifying those media content items that are suitable for running based upon comparison to the model; and presenting those media content items to a user.

In yet another aspect, a method for selecting media content that is suitable for running, the method comprising: identifying a playlist of potential example media content items, the playlist having characteristics that are suitable for running; selecting certain media content items from the potential example media content items, the certain media content items being suitable for running; developing a model based upon the certain media content items; reviewing a list of media content items; comparing each of the media content items in the list to the model; identifying those media content items in the list that are suitable for running based upon comparison to the model; and presenting those media content items to a user.

DETAILED DESCRIPTION

Figure 1:
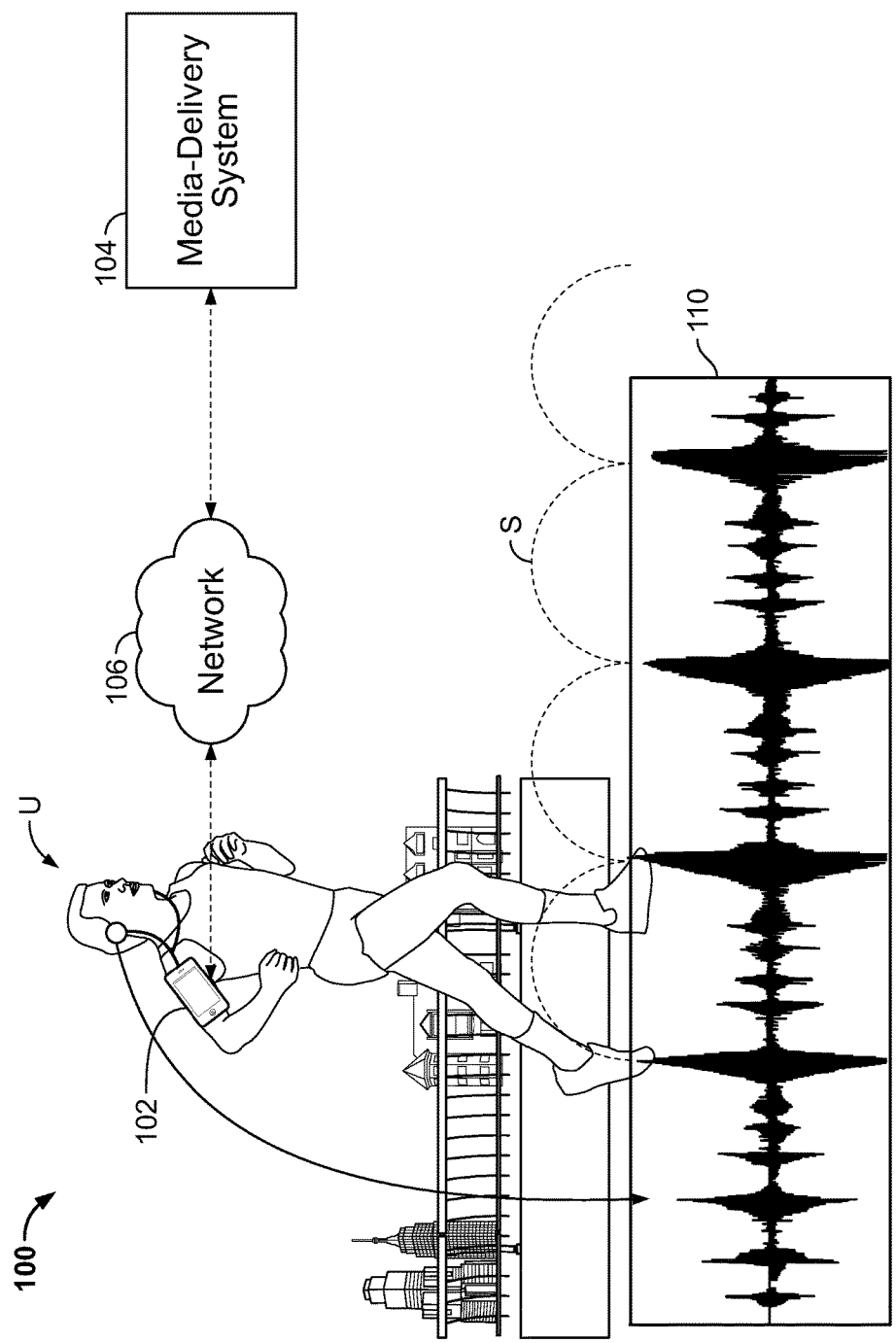
FIG. 1 illustrates an example system for tempo searching and media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive-motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive-motion activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

FIG. 1 illustrates an example system 100 for cadence determination and media content selection. The example system 100 includes a media-playback device 102 and a media-delivery system 104. The system 100 communicates across a network 106. Also shown, is a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM.

Further, in some embodiments, the media-playback device 102 operates to play music having a tempo equal to or approximately equal to a user U's cadence after it is rounded. For example, the cadence may be rounded to the nearest multiple of 2.5, 5, or 10 and then the media-playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

Figure 2:
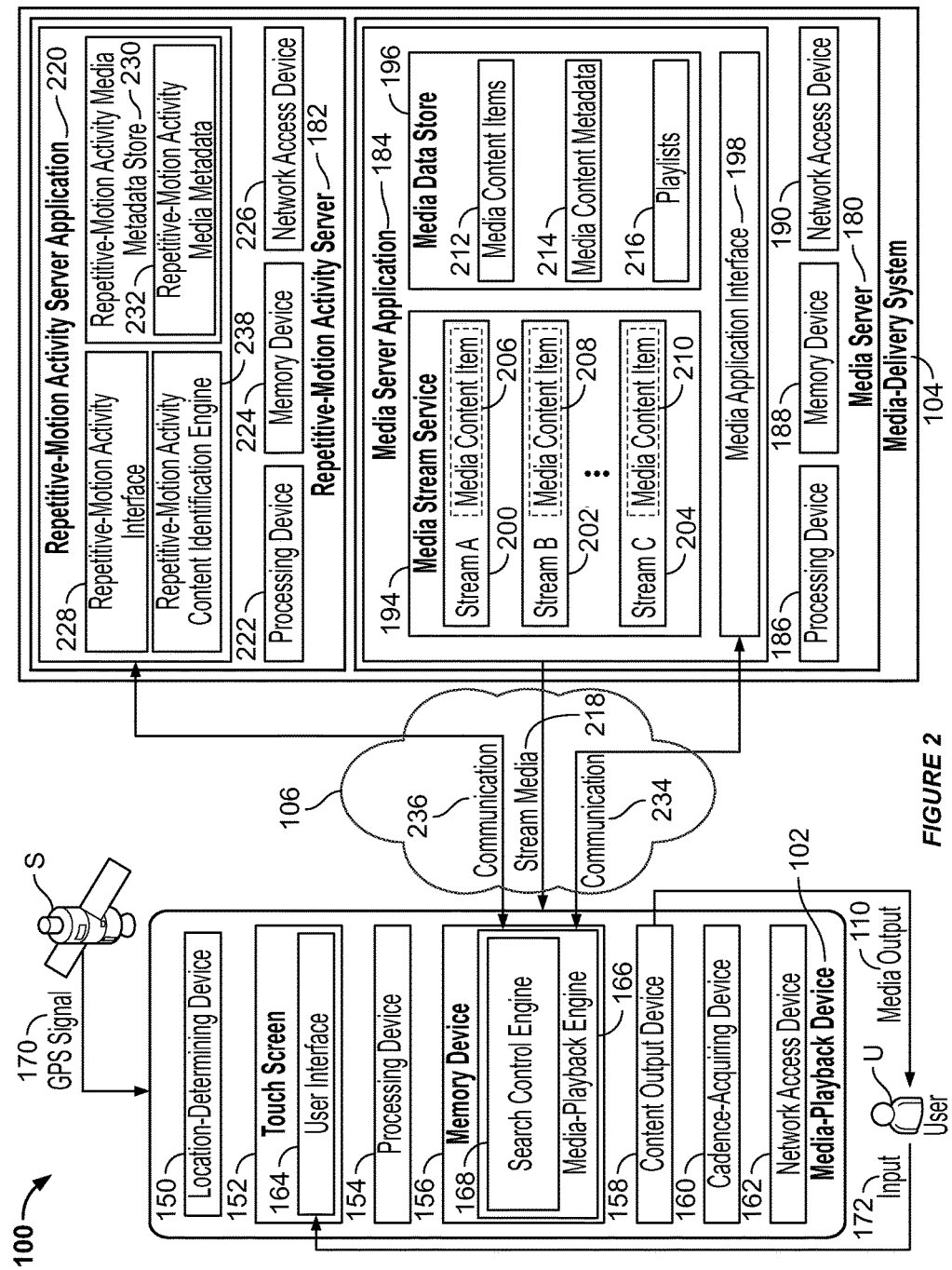
FIG. 2 is a schematic illustration of the example system of FIG. 1.

FIG. 2 is a schematic illustration of an example system 100 for cadence determination and media content selection. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a search control engine 168. In some embodiments, the media-playback engine 166 operates to playback media content and the search control engine 168 operates to identify or retrieve media content for playback based on various conditions. Additional details regarding the search control engine 168 are provided below.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228, a repetitive-motion activity media metadata store 230, and a repetitive-motion activity content identification engine 238.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive-motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

The repetitive-motion activity content identification engine 238 operates to identify media content items that are suitable for playback during one or more types of repetitive-motion activity and for one or more users. Aspects of the repetitive-motion activity content identification engine 238 is illustrated and described with respect to at least FIGS. 3-9.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that correspond to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for cadence determination and media content selection, other embodiments are possible as well. For example, in some embodiments, the media-playback device 102 includes a media data store 196 and the media-playback device 102 is configured to perform cadence determination and media content selection without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive-motion activity on the media-playback device 102.

Figure 3:
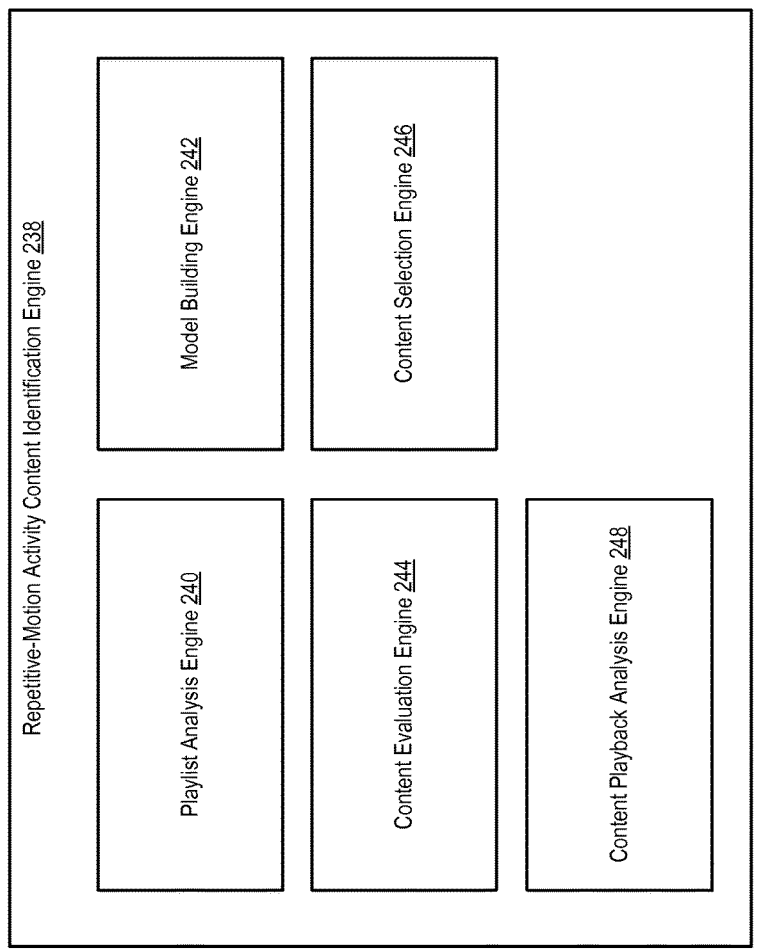
FIG. 3 is a schematic block diagram of the repetitive-motion activity content identification engine of FIG. 2.

FIG. 3 is a schematic block diagram of the repetitive-motion activity content identification engine 238. In some embodiments, repetitive-motion activity content identification engine 238 includes a playlist analysis engine 240, a model building engine 242, a content evaluation engine 244, a content selection engine 246, and a content playback analysis engine 248.

The playlist analysis engine 240 operates to analyze playlists to identify media content items that users have identified as being suitable for playback during repetitive-motion activities (e.g., media content items that are runnable). Example methods performed by some embodiments of the playlist analysis engine 240 are illustrated and described with respect to at least FIG. 5.

The model building engine 242 operates to build one or more models that can be used to identify media content items for playback during one or more types of repetitive-motion activities. In various embodiments, the model building engine 242 uses one or more machine learning techniques to build the models. Example methods performed by some embodiments of the model building engine 242 are illustrated and described with respect to at least FIG. 6.

The content evaluation engine 244 operates to evaluate media content items to determine whether the media content items may be suitable for playback during one or more types of repetitive-motion activity. In some embodiments, a media content item is suitable for playback during a repetitive-motion activity if it is likely that the playback of the media content item is likely to enhance a user's performance or enjoyment of the repetitive-motion activity. As another example, a media content item that is conducive to the repetitive-motion activity is suitable for playback during the repetitive-motion activity. In some embodiments, the content evaluation engine 244 uses models generated by the model building engine 242. Additionally, in some embodiments, the content evaluation engine 244 generates scores for media content items based on the suitability of the media content items for playback during one or more repetitive-motion activities. Example methods performed by some embodiments of the content evaluation engine 244 are illustrated and described with respect to at least FIG. 7.

The content selection engine 246 operates to select media content items for playback during a repetitive-motion activity. In at least some embodiments, the content selection engine 246 filters media content items based on one or more characteristics including but not limited to a score generated by the content evaluation engine 244. Example methods performed by some embodiments of the content selection engine 246 are illustrated and described with respect to at least FIG. 8.

The content playback analysis engine 248 operates to analyze the playback (or use) of media content items by users. In some embodiments, the content playback analysis engine 248 identifies media content items that are frequently played back or skipped during repetitive-motion activities. Additionally, in some embodiments, the content playback analysis engine 248 uses one or metrics related to the repetitive-motion activity such as performance metrics, physiological metrics, and enhancement metrics. Examples of performance metrics include speed and cadence. Example physiological metrics include physiological measurements such as heart rate. Examples of enhancement metrics include cadence alignment to the media content. Other metrics that are analyzed by some embodiments include whether a user indicated liking a media content item (e.g., by actuating a like control during playback or at a later time such as during a playlist review after completion of the repetitive-motion activity), whether the user added the media content item to a playlist, etc. Example methods performed by some embodiments of the content selection engine 246 are illustrated and described with respect to at least FIG. 9.

Figure 4:
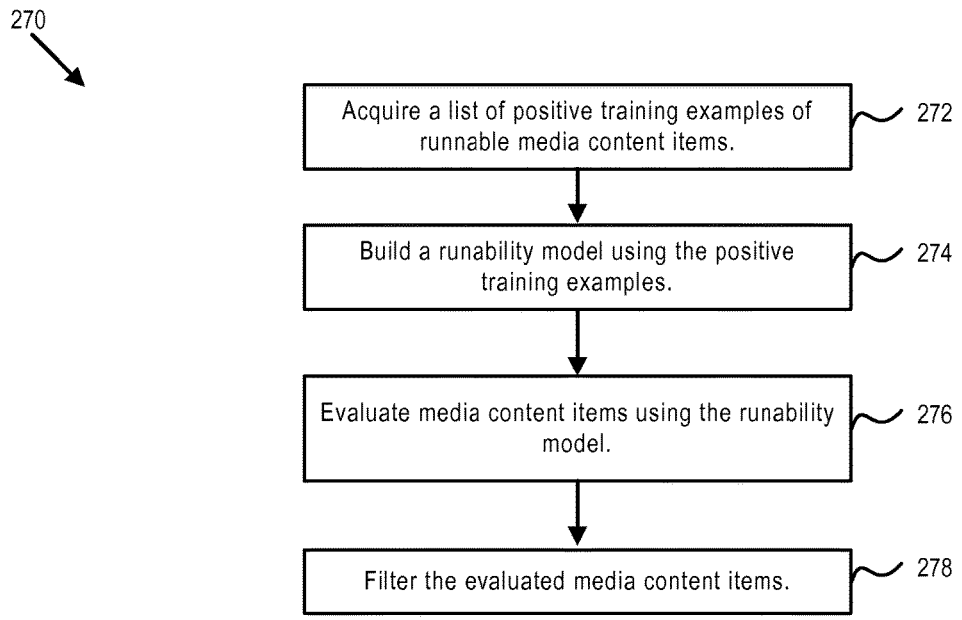
FIG. 4 illustrates an example method of identifying media content for playback during a repetitive-motion activity performed by some embodiments of the repetitive-motion activity content identification engine of FIG. 2.

FIG. 4 illustrates an example method 270 of identifying media content for playback during a repetitive-motion activity performed by some embodiments of the repetitive-motion activity content identification engine 238. Such a method can be used, for example, when the user is engaged in repetitive-motion activities, such as running, biking, or walking. Media content, such as music, can impact the performance or enjoyment of such activities. For example, as noted above, music of a faster tempo can encourage the user U to run at a faster cadence.

At operation 272, a list of positive training examples of runnable media content items is acquired. In some embodiments, the list is generated by analyzing playlists of one or more users to identify media content items that have been added to a running related playlist. In other embodiments, a user may identify one or media content items he or she enjoys running to.

At operation 274, a runnability model is built using the positive training examples. In various embodiments, the runnability model is built using one or more machine learning techniques. Further, in some embodiments, the model is built based on audio analysis of the media content items. Additionally, in some embodiments, the model is built based on metadata associated with the media content items. A runnability model is an example of a repetitive-motion model.

At operation 276, media content items are evaluated using the runnability model generated in operation 274. In some embodiments, some or all of the media content items stored in the media data store 196 are evaluated. Some embodiments evaluate a subset of the media content items based on a characteristic such as a genre, era, popularity, tempo, etc. In some embodiments, a runnability score is generated for at least some of the evaluated media content items. In some embodiments, the runnability score is a value that corresponds to how similar a media content item is to the positive training examples as calculated using the runnability model. In some embodiments, the runnability score is a numerical value in the range of 0-1 in which higher values indicate the media content item is more similar to the positive training examples than a lower value. Some embodiments store the runnability scores in the repetitive-motion activity media metadata 232.

At operation 278, the evaluated media content items are filtered. The media content items may be filtered based on a variety of characteristics, including a runnability score threshold, a genre, and a tempo range. Additionally, some embodiments operate to filter media content items based on analysis of audio signals associated with the media content item. For example, media content items that include a variable tempo may be excluded. As another example, media content items having quiet or low-energy portions with a duration greater than a predetermined threshold are excluded. However, in some embodiments if the quiet or low-energy portion is near the beginning or end of the media content item, the media content item is not excluded. Instead, the quiet or low-energy portion may be excluded using mix-in or mix-out points. Examples of calculating and using mix-out and mix-in points are provided in U.S. Patent Application Ser. No. 62/163,865, titled SYSTEM FOR MANAGING TRANSITIONS BETWEEN MEDIA CONTENT ITEMS, filed on May 19, 2015, the entirety of which is hereby incorporated by reference.

In some embodiments, the media content items that pass all of the filters are identified as runnable and a runnable flag (e.g., a Boolean value field) in the repetitive-motion activity metadata associated with the media content item. Alternatively, the runnability score of media content items that do not pass the filters may be adjusted (e.g., lowered or set to zero).

Although the method 270 has been described sequentially, in some embodiments the operations of method 270 are performed in different orders or include different operations. Additionally, in some embodiments, the operations of method 270 may be performed at different times or repeated independent of each other. For example, in some embodiments, operations 272 and 274 are repeated on a regular schedule (e.g., weekly, monthly, annually, etc.) to generate or update a list of runnable songs and the runnability model built from that list. While operations 276 and 278, on the other hand, are performed once initially on all media content items in the media data store 196 and is then repeated on new media content items as those new media content items are added to the media data store 196. Additionally, some embodiments do not perform operation 278.

Figure 5:
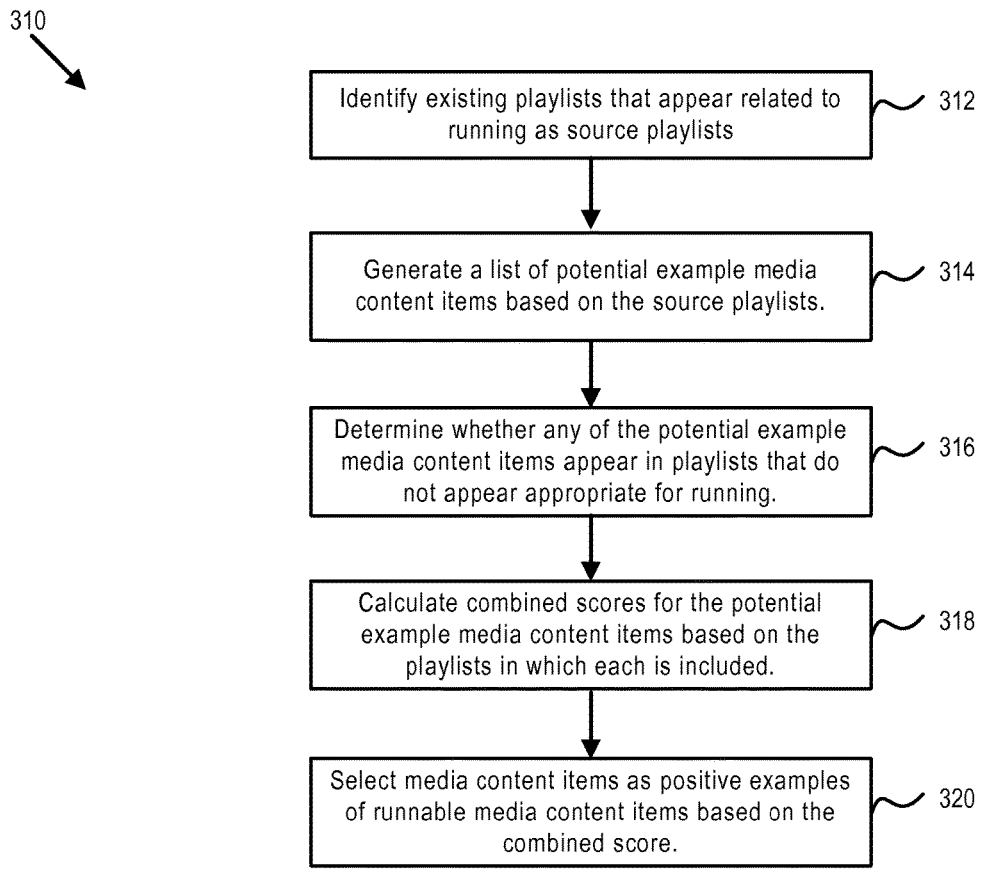
FIG. 5 illustrates an example method of acquiring a list of positive examples of runnable media content items that is performed by some embodiments of the playlist analysis engine of FIG. 2.

FIG. 5 illustrates an example method 310 of acquiring a list of positive examples of runnable media content items that is performed by some embodiments of the playlist analysis engine 240. Such a method can be used, for example, to identify media content items as runnable based on the playlists users have created.

At operation 312, playlists that appear related to running are identified as source playlists. The playlists may be identified by analyzing the playlists 216. In some embodiments, source playlists are identified based on the inclusion of certain words or phrases in a title or description associated with the playlist. For example, words that are related to running (e.g., run, running, jog, marathon, 5 k, etc.) may be used to identify source playlists. Additionally, in some embodiments, words that relate to fitness (work out, health club, training, etc.) are also used to identify source playlists. Furthermore, in some embodiments, words that relate to other types of repetitive-motion activities are also used to identify source playlists.

At operation 314, a list of potential example media content items is generated based on the source playlists. In some embodiments, all media content items appearing in at least a predetermined number of playlists are included in the list. In embodiments, the predetermined number is 1, 2, 5, 10, 50, 100, 500, or another number.

Further some embodiments, analyze the source playlists to further determine the relevance of the playlist to running. The analysis may be based on many factors including the words that were used to identify the source playlist, whether the words appeared in a title or a description, the curator of the playlist, the number of users that follow the playlist, the number of times the playlist has been played, etc. In some embodiments, a weighting scheme is used to calculate a weight value for the source playlists. Example weighting schemes used in some embodiment include: weighting a playlist that includes words associated with running higher than a playlist that includes words associated with fitness or another repetitive-motion activity; weighting a playlist that includes a relevant word in a title higher than a playlist that includes a relevant word in a description; weighting a playlist curated by a streaming service (or professional curator) higher than a playlist curated by a user (or vice versa); weighting a playlist with more followers higher than a playlist with fewer followers; weighting a playlist that has been played more times higher than a playlist that has been played fewer times. In some embodiments, the weighted values of the source playlists that include a particular potential example media content item are summed (or otherwise combined) and the resulting value (referred to as a positive playlist inclusion score herein) is compared to a predetermined threshold. The potential example media content items with a positive playlist inclusion score that exceeds the threshold may be analyzed further as described below.

At operation 316, it is determined whether the potential example media content items are included in playlists that appear inappropriate for running. In some embodiments, playlists are identified as inappropriate for running based on the inclusion of words or phrases in a title that are related to relaxing (e.g., calming, chill, relax, wind down, sleep, calm, etc.). In some embodiments, a negative playlist inclusion score is calculated for the potential example media content items based on being included in playlists that are identified as not being appropriate for running. The negative playlist inclusion score for a potential example media content item is calculated in a similar manner and according to similar factors as the positive playlist inclusion score.

At operation 318, a combined playlist inclusion score is calculated for the potential example media content items included in the list based on the playlists in which the potential example media content items are included. In some embodiments, the combined playlist inclusion score is calculated as a ratio of the positive playlist inclusion score to the negative playlist inclusion score. In other embodiments, the combined playlist inclusion score is calculated otherwise, such as by calculating a difference between the positive playlist inclusion score and the negative playlist inclusion score. Further, in some embodiments, the combined playlist inclusion score is calculated as a difference between or ratio of the number of playlists that appear related to running and the number of playlists that appear inappropriate for running in which the media content item is included.

At operation 320, potential example media content items are selected as positive example media content items based upon the combined playlist inclusion score In some embodiments, potential example media content items that have a combined playlist inclusion score exceeding a predetermined threshold are selected as positive examples of runnable media content items. As an example, when the combined playlist inclusion score is calculated as a ratio, the predetermined threshold is two, three, four, five, or ten in some embodiments. Other embodiments use a predetermined threshold in a range of one to twenty-five. Additionally, in some embodiments, a predetermined number of media content items having the highest combined playlist inclusion scores are selected as positive examples.

Figure 6:
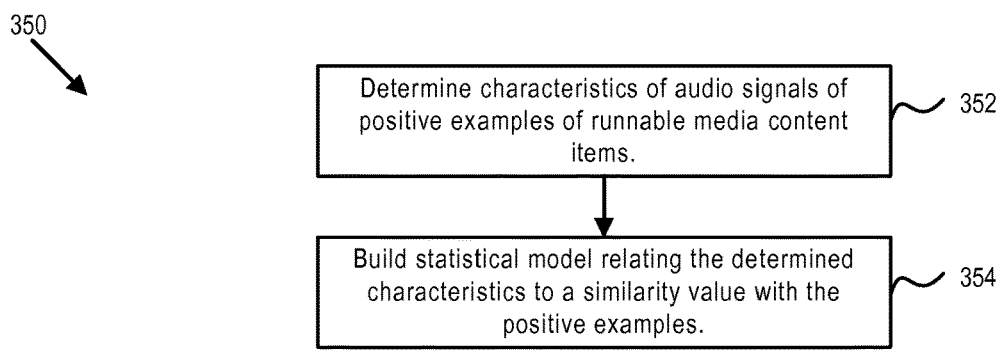
FIG. 6 illustrates an example method of building a runnability model based on positive examples of runnable media content items that is performed by some embodiments of the model building engine of FIG. 2.

FIG. 6 illustrates an example method 350 of building a runnability model based on positive examples of runnable media content items that is performed by some embodiments of the model building engine 242. Such a method can be used, for example, to build a model for classifying or identifying additional media content items as runnable.

At operation 352, characteristics of the audio signals of the positive examples of runnable media content items are determined. In some embodiments, the audio signals of the positive examples are analyzed to determine the characteristics. Additionally, in some embodiments, some or all of the characteristics of the audio signals are retrieved from the media content metadata 214 or elsewhere.

Example characteristics determined by some embodiments include an average duration of a musical event such as a single note or other musical event, a tempo regularity, a percussivity, and a beat strength. In some embodiments, the average duration of a musical event is calculated in various ways, including by dividing a total number of musical events in a media content item by a duration of the media content item. The tempo regularity corresponds to the consistency of the beat in a media content item. In some embodiments, the tempo regularity is based on calculating a standard deviation or variance value for measurements of the tempo over multiple intervals of a media content item. The percussivity corresponds to the strength or contribution of percussive instruments (or synthesized equivalents) to the media content item. The beat strength is proportional to the loudness of musical events that happen in correspondence to a beat. Some embodiments also include characteristics that are determined by other machine learning models. For example, some embodiments, include an energy characteristic that is calculated by a machine learning model trained to rate the relative energy levels of various media content items similarly to a user's rating. Other embodiments determine additional, different, or fewer characteristics.

At operation 354, the determined characteristics are used to build a statistical model that relates the determined characteristics to a similarity value to the positive examples. In some embodiments, the model is a function or equation that operates on the values of the various characteristics to calculate a value corresponding to the similarity to the positive examples. In some embodiments, the model represents each characteristic as a dimension in a multi-dimensional space. Further, in some embodiments, the model defines an equation to compute the likelihood of a media content item being similar to the positive examples as far as the modeled characteristics are concerned.

In some embodiments, various machine learning techniques are used to generate the model. For example, in some embodiments, the model is generated using a variational Bayes Gaussian mixture model. In other embodiments, other machine learning techniques are used as well.

Figure 7:
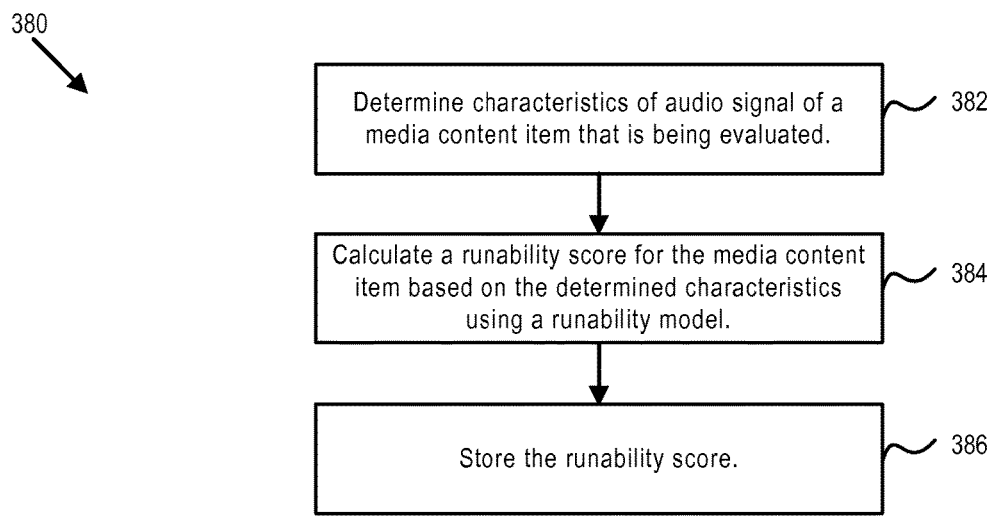
FIG. 7 illustrates an example method of evaluating media content items using a runnability model that is performed by some embodiments of the content evaluation engine of FIG. 2.

FIG. 7 illustrates an example method 380 of evaluating media content items using a runnability model that is performed by some embodiments of the content evaluation engine 244. Such a method can be used, for example, to calculate a runnability score for media content items.

At operation 382, characteristics of the audio signal of a media content item that is being evaluated are determined. The operation 382 is similar to the operation 352 except that the characteristics are determined for the media content item that is being evaluated rather than the positive examples.

At operation 384, a runnability score is calculated using the runnability model and the determined characteristics. As noted above, the runnability model operates to calculate a value that corresponds to the similarity between the characteristics of the media content item being classified and the characteristics of the positive examples used to generate the model. In some embodiments, the value calculated using the runnability model is scaled to a numeric value between 0-1. Alternatively, the runnability score may be a Boolean value representing whether the value calculated by the runnability model satisfies a predetermined threshold for identifying a media content item as being runnable.

At operation 386, the runnability score is stored. In some embodiments, the runnability score is stored in the repetitive-motion activity media metadata 232 or the media content metadata 214.

Figure 8:
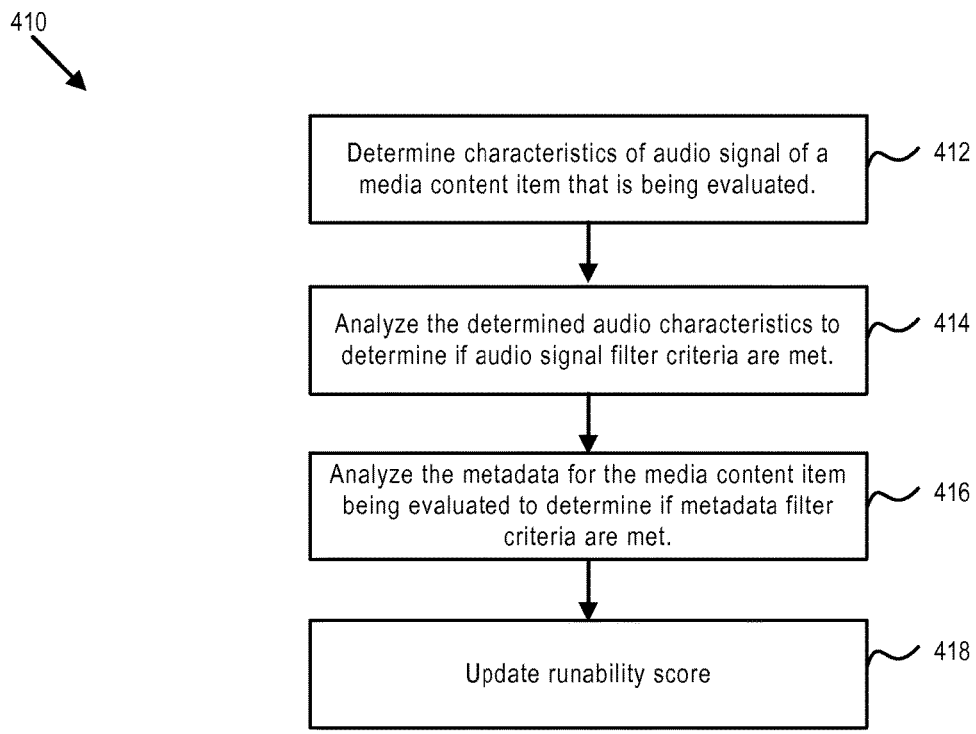
FIG. 8 illustrates an example method of filtering a media content item for runnability that is performed by some embodiments of the content evaluation engine of FIG. 2.

FIG. 8 illustrates an example method 410 of filtering a media content item for runnability that is performed by some embodiments of the content evaluation engine 244. Such a method can be used, for example, to exclude certain media content items that are unlikely to be suitable for playback during running.

At operation 412, characteristics of the audio signal of a media content item that is being evaluated are determined. The operation 412 is similar to the operations 352 and 382, however in some embodiments different or additional characteristics are determined. In some examples, a tempo regularity value is calculated as described above with respect to at least the operation 352 of FIG. 6. In addition, in some embodiments, a maximum duration of quietness and a maximum duration of lower energy are determined as well. In some embodiments, the maximum duration of quietness is based on a threshold volume level and operates to identify a maximum consecutive duration of the media content item that is below the threshold volume level. Similarly, the maximum duration of lower energy is based on a threshold volume level and operates to identify a maximum consecutive duration of the media content item that is below the threshold energy level. In some embodiments, the maximum duration of quietness and maximum duration of lower energy are calculated for a portion of the media content item identified by a mix-in point and mix-out point. Examples of calculating and using an energy level of a portion of media content item are also provided in U.S. Patent Application Ser. No. 62/163,865, discussed above.

At operation 414, the determined audio characteristics are analyzed to determine if one or more audio signal criteria are met. The audio signal filters may operate to exclude media content items having audio signal characteristics that do not meet certain predetermined threshold values. Embodiments include one or more of the following example audio signal filters: a tempo regularity filter that operates to exclude media content items that do not meet a predetermined threshold for tempo regularity; a quiet gap filter that operates to exclude media content items that have a maximum duration of quietness that exceeds a predetermined threshold value; and a low-energy gap filter that operates to exclude media content items that have a maximum duration of low energy that exceeds a predetermined threshold value. Other embodiments include additional, different, or fewer audio signal filters.

At operation 416, the metadata for the media content item being evaluated is analyzed to determine if metadata filter criteria are met. In some embodiments, the metadata for the media content item being evaluated is retrieved from the media content metadata 214, the repetitive-motion activity media metadata 232, or elsewhere.

The metadata filters may operate to exclude media content items having metadata characteristics. Some embodiments include a genre filter that operates to exclude media content items of a particular genre (e.g., children's music or holiday music). Other embodiments include additional, different, or fewer metadata filters.

At operation 418, a stored runnability score associated with the media content item being evaluated is updated. For example, in some embodiments, if the media content item failed either the audio signal filters (operation 414) or the metadata filters (operation 416) then the runnability score is reduced or set to zero. Additionally, in some embodiments, a field is stored separately from the runnability score to categorically block (e.g., blacklist) media content items that fail to pass at least some of the filters discussed herein.

Figure 9:
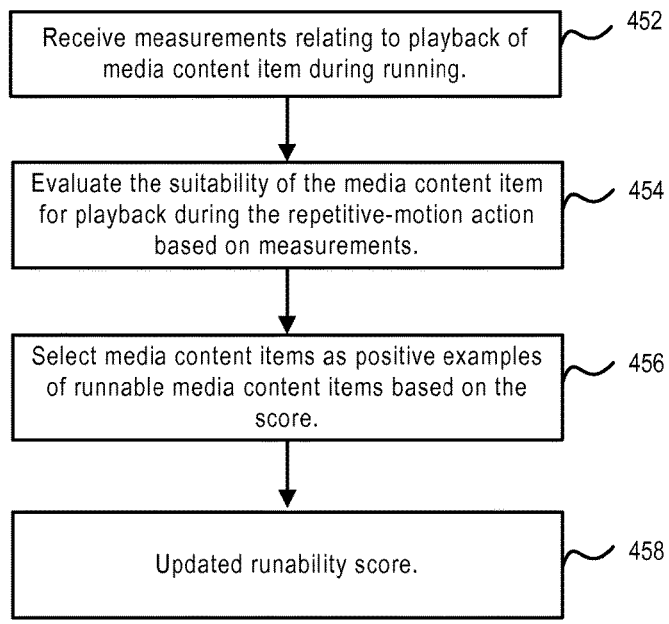
FIG. 9 illustrates an example method of analyzing the playback of media content items during running that is performed by some embodiments of the content playback analysis engine of FIG. 2.

FIG. 9 illustrates an example method 450 of analyzing the playback of media content items during running that is performed by some embodiments of the content playback analysis engine 248. Such a method can be used, for example, to identify media content items as runnable based on analyzing the playback of the media content items during running (or additionally or alternatively, in some embodiments, other repetitive-motion activities). The method 450 can be used to identify media content items that have positive effects on running. The method 450 can also be used to identify media content items that have negative effects on running. In some embodiments, the media content items having a positive effect are identified as positive examples for use in building or updating a runnability model as illustrated and described with respect to at least FIG. 6. Additionally, in some embodiments, the runnability scores of media content items that are identified as having a strong positive or negative effect are updated by the method 450.

At operation 452, measurements related to running while a particular media content item is being played back are received. In various embodiments, various measurements are received. In some embodiments, some or all of the measurements are captured by the media-playback device and transmitted to the media-delivery system 104. Example measurements include cadence, pace, cadence phase alignment to the media content item, and various physiological measurements. Examples of calculating cadence phase alignment to the media content item are provided in U.S. Patent Application Ser. No. 62/163,856, titled CADENCE AND MEDIA CONTENT PHASE ALIGNMENT, filed on May 19, 2015, the entirety of which is hereby incorporated by reference. Examples of capturing and using physiological measurements are provided in U.S. Patent Application Ser. No. 62/163,915, titled HEART RATE CONTROL BASED UPON MEDIA CONTENT SELECTION, filed on May 19, 2015, the entirety of which is hereby incorporated by reference. In some embodiments, pace is calculated from cadence with an estimated or calibrated stride length. Additionally, pace can be calculated using the location-determining device 150.

Furthermore, in some embodiments the received measurements relate to a single user. Additionally, in some embodiments, the received measurements relate to multiple users and are received from multiple media-playback devices. In some embodiment, the measurements are received and captured for a time period (e.g., a week, a month, two months, three months, six months, etc.).

At operation 454, the suitability of the media content items for playback during running is evaluated based on the received measurements. In some embodiments, a score is generated that corresponds to the suitability of a particular media content item for playback during running. In some embodiments, the suitability of a media content item is calculated based on comparing the captured measurements to a target value for the parameter being measured. For example, if the user has indicated a desire to run with a cadence of 180 steps per minute, media content items that were played back while measurements of cadence that are close to 180 steps per minute were captured may be considered to positively affect the repetitive-motion activity. In some embodiments, the media content items are compared to one another to determine which media content items have a greater positive effect on the repetitive-motion activity. Beneficially, this comparative evaluation can be helpful to differentiate the effect of the media content item from the user's underlying performance or ability. Additionally, in some embodiments, media content items are evaluated based in part on calculating a metric related to how much the measurements change during playback of the media content item (e.g., standard deviation or variance). Further, in some embodiments, the media content items are evaluated based on whether users indicate liking a media content item (e.g., by actuating a like or favorite control) or disliking the media content item (e.g., by actuating a dislike control or skipping the media content item) when it is played during running.

At operation 456, at least some of the media content items for which measurements were received are identified as positive examples of runnable media content items. In some embodiments, the media content items are compared to a predetermined threshold for a suitability score. Additionally, in some embodiments, a predetermined number of the highest scoring media content items are selected as positive examples. The newly selected positive examples may be included with other previously selected positive examples or may be used to replace the previously selected positive examples.

At operation 458, a runnability score for the media content items for which measurements were received is updated based on whether it was determined that the media content item has a positive or negative effect on running. For example, the runnability score for a particular media content item is increased if it is determined that the media content item has a positive effect on running. Conversely, the runnability score for a particular media content item is decreased if it is determined that the media content item has a negative effect on running.

Figure 10:
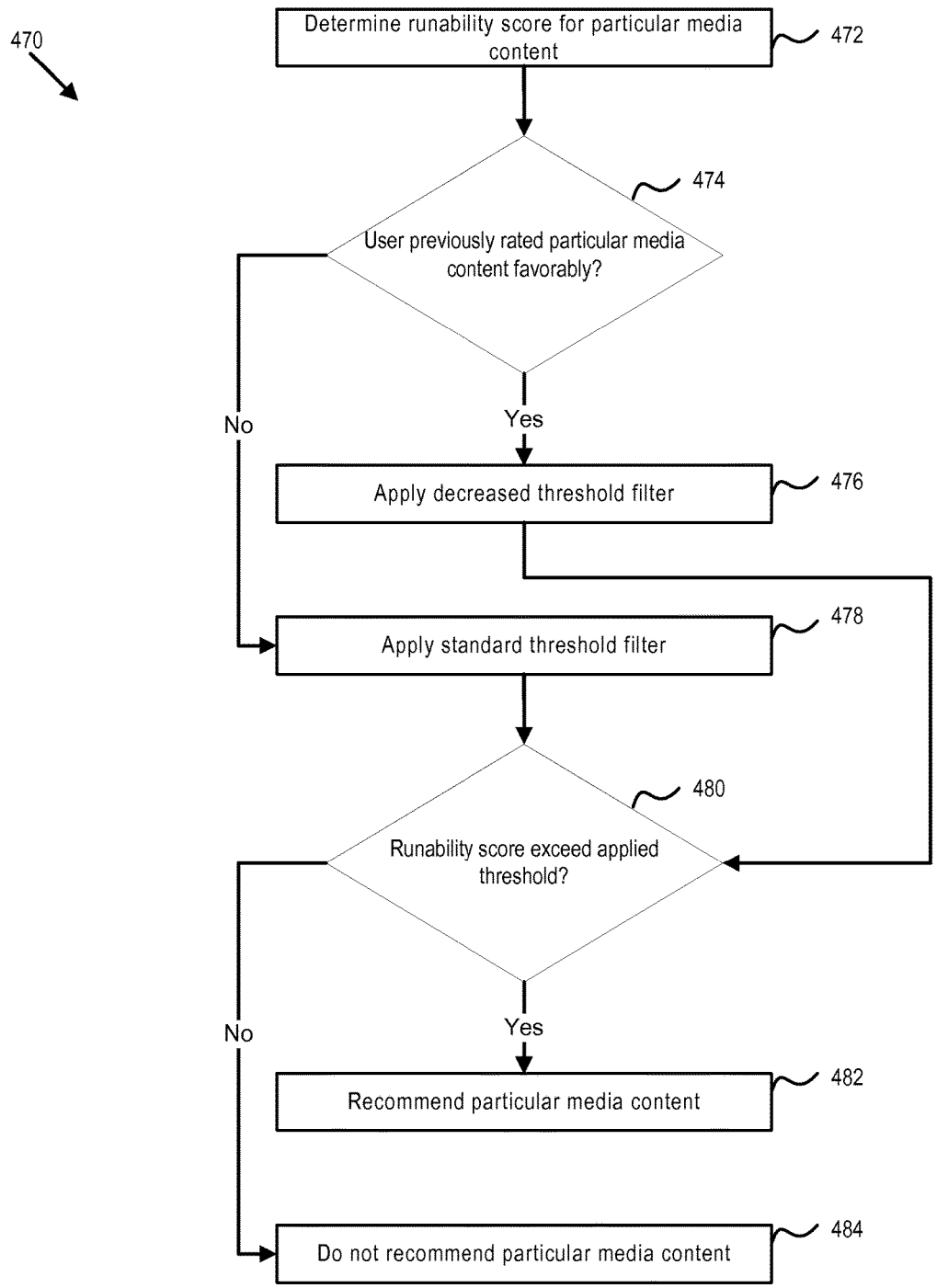
FIG. 10 illustrates an example method of searching for and filtering media content items based on a runnability score that is performed by some embodiments of the search control engine of FIG. 2.

FIG. 10 illustrates an example method 470 of searching for and filtering media content items based on a runnability score that is performed by some embodiments of the search control engine 168. Such a method can be used, for example, to identify media content items suitable for playback to a particular user during running. Additional details on searching for and filtering media content is provided in U.S. Patent Application Ser. No. 62/163,927, titled SEARCH MEDIA CONTENT BASED UPON TEMPO, filed on May 19, 2015, the entirety of which is hereby incorporated by reference.

At step 472, the runnability score for a particular media content item is determined. This can be accomplished using the processes described above. Alternatively, the runnability score may be stored as part of the metadata associated with the media content item.

Next, at step 474, a determination is made regarding whether or not the user previously rated the particular media content item. For example, as described previously, the user U can rate a particular media content item as one the user likes or dislikes. If the user has previously liked the particular media content item, control is passed to step 476, and a decreased threshold filter is used. Otherwise, control is passed to step 478, and a standard filter threshold is used.

For example, if the user has previously "liked" the particular media content item, the decreased threshold filter may require that the runnability score for the media content item be at least 0.4. Alternatively, if the media content item has not been previously rated, the standard threshold filter may require that the runnability score for the media content item be at least 0.6. In this manner, media content items that were previously marked as "liked" are favored.

Next, at step 480, the relevant filter (i.e., decreased or standard threshold) is applied. If the media content item exceeds the threshold of the applied filter, control is passed to step 482, and the media content item is recommended to the user. Otherwise, control is passed to step 484, and the media content item is not recommended.

As noted previously, although many of the examples provided above are described with respect to running, other embodiments relate to other repetitive-motion activities as well such as cycling, swimming, and rowing.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following disclosure.

What is claimed is:

1. A media system comprising:
   at least one hardware processing device;
   a media-output device that plays media content items; and
   at least one computer readable data storage device storing data instructions that, when executed by the at least one hardware processing device, cause the media system to:
     identify, from a plurality of playlists, a subset of playlists containing one or more repetitive-motion activity related keywords appearing in descriptions associated with the subset of playlists, wherein the plurality of playlists include media content items;
     evaluate a plurality of media content items included in the subset of playlists, and identify based on a playlist inclusion score a plurality of positive example media content items from the plurality of media content items for playback during repetitive motion activities, wherein the playlist inclusion score is calculated as a difference between a number of playlists that include the media content item, from the plurality of playlists, that are conducive to performing the repetitive-motion activities and a number of playlists that include the media content item, from the plurality of playlists, that are inappropriate for performing the repetitive-motion activities;
     generate a model usable to characterize a suitability of media content items for repetitive motion activities based on characteristics of audio signals of the identified plurality of positive example media content items that have playlist inclusion scores that exceed a threshold;
     review media content items to identify the media content items that are conducive to performing repetitive-motion activities; and
     select certain media content items from the media content items based upon comparison to the generated model, the certain media content items being conducive to performing the repetitive-motion activities.

2. The media system of claim 1, comprising further data instructions that cause the processing device to:
   identify potential example media content items, the potential example media content items being identified based on inclusion in a playlist having characteristics that are conducive to performing the repetitive-motion activities; and
   calculate a combined playlist inclusion score for at least one of the potential example media content items based on characteristics of playlists in which the potential example media content item is included.

3. The media system of claim 2, comprising further data instructions that cause the processing device to:
   review an aspect associated with a plurality of playlists to identify the playlist.

4. The media system of claim 3, wherein the aspect is one or more words in a title of the playlist.

5. The media system of claim 1, comprising further data instructions that cause the processing device to:
   calculate a score for each of the media content items; and
   select certain media content items based upon the score.

6. The media system of claim 1, comprising further data instructions that cause the processing device to:
   use a repetitive motion activity model to analyze audio signals associated with each of the media content items; and
   compare aspects of the audio signals to the repetitive-motion activity model to determine if each of the media content items is conducive to performing the repetitive-motion activities.

7. The media system of claim 6, wherein the aspects of the audio signals include one or more of an average musical event duration, a tempo regularity, a percussivity, and a beat strength.

8. A method for selecting media content that is suitable for running, the method comprising:
   identifying, from a plurality of playlists, a subset of playlists containing one or more running related keywords appearing in descriptions associated with the subset of playlists, wherein the plurality of playlists include media content items;
   evaluating a plurality of media content items included in the subset of playlists, and identifying based on a playlist inclusion score a plurality of positive example media content items from the plurality of media content items for playback during running, wherein the playlist inclusion score is calculated as a difference between a number of playlists that include the media content item, from the plurality of playlists, that are conducive to running and a number of playlists that include the media content item, from the plurality of playlists, that are inappropriate for running;
   generating a model usable to characterize a suitability of media content items for running based on characteristics of audio signals of the identified plurality of positive example media content items that have playlist inclusion scores that exceed a threshold;
   reviewing a list of media content items;
   comparing each of the media content items in the list of media content items to the generated model;
   identifying those media content items that are suitable for running based upon comparison to the generated model; and
   presenting those media content items to a user.

9. The method of claim 8, further comprising:
   identifying a playlist of potential example media content items, the playlist having characteristics that are suitable for running;

reviewing the potential example media content items to identify media content items that are not suitable for running;

selecting certain media content items from the potential example media content items, the certain media content items being suitable for running; and developing the model based upon the certain media content items.

10. The method of claim 9, further comprising using machine learning techniques to build the model.

11. The method of claim 9, further comprising calculating a combined playlist inclusion score for at least one of the potential example media content items based on characteristics of playlists in which the potential example media content item is included.

12. The method of claim 9, wherein identifying the playlist further comprises reviewing an aspect associated with a plurality of playlists to identify the playlist.

13. The method of claim 12, wherein the aspect is a title of the playlist.

14. The method of claim 8, further comprising:

calculating a score for each of the media content items using the model; and selecting certain media content items based upon the score.

15. The method of claim 14, further comprising analyzing audio signals associated with each of the media content items to determine the score for each of the media content items in the list.

16. The method of claim 15, wherein analyzing the audio signals includes examining one or more of an average musical event duration, a tempo regularity, a percussivity, and a beat strength.

17. A method for selecting media content that is suitable for running, the method comprising:

identifying, from a plurality of playlists, a subset of playlists comprising a plurality of potential example media content items based on one or more running-related keywords appearing in descriptions associated with the subset of playlists, wherein the subset of playlists have characteristics that are suitable for running;

evaluating the subset of playlists, and selecting based on a playlist inclusion score positive example media content items from the potential example media content items, the positive example media content items being suitable for running, the playlist inclusion score is calculated as a difference between a number of playlists that include the potential example media content items, from the plurality of playlists, that are conducive to running and a number of playlists that include the potential example media content items, from the plurality of playlists, that are inappropriate for running;

developing a model usable to characterize a suitability of media content items for running based upon characteristics of audio signals of the identified plurality of positive example media content items that have playlist inclusion scores that exceed a threshold;

reviewing a list of media content items;

comparing each of the media content items in the list of media content items to the model;

identifying those media content items in the list of media content items that are suitable for running based upon comparison to the model; and presenting those media content items to a user.

18. The method of claim 17, further comprising using machine learning techniques to build the model.

19. The method of claim 17, further comprising calculating a combined playlist inclusion score for at least one of the potential example media content items based on characteristics of playlists in which the potential example media content item is included.

20. The method of claim 17, further comprising:

calculating a score for each of the media content items in the list; and analyzing audio signals associated with each of the media content items to determine the score for each of the media content items in the list, wherein analyzing the audio signals includes examining one or more of an average musical event duration, a tempo regularity, a percussivity, and a beat strength.

* * * * *